United States Patent
Ikegami

(10) Patent No.: US 9,906,421 B2
(45) Date of Patent: Feb. 27, 2018

(54) NETWORK DEVICE, COMMUNICATION METHOD, PROGRAM, AND RECORDING MEDIUM

(71) Applicant: ALLIED TELESIS HOLDINGS K.K., Shinagawa-ku, Tokyo (JP)

(72) Inventor: Tokunori Ikegami, Tokyo (JP)

(73) Assignee: ALLIED TELESIS HOLDINGS K.K., Tokyo (JP)

(*) Notice: Subject to any disclaimer, the term of this patent is extended or adjusted under 35 U.S.C. 154(b) by 122 days.

(21) Appl. No.: 14/748,698

(22) Filed: Jun. 24, 2015

(65) Prior Publication Data

US 2016/0020974 A1 Jan. 21, 2016

(30) Foreign Application Priority Data

Jul. 18, 2014 (JP) ................. 2014-147817

(51) Int. Cl.
*H04L 12/26* (2006.01)
*H04L 12/705* (2013.01)

(52) U.S. Cl.
CPC .......... *H04L 43/0811* (2013.01); *H04L 45/18* (2013.01)

(58) Field of Classification Search
None
See application file for complete search history.

(56) References Cited

U.S. PATENT DOCUMENTS

| | | | |
|---|---|---|---|
| 6,765,877 B1 * | 7/2004 | Foschiano | H04L 45/02 370/242 |
| 6,857,027 B1 * | 2/2005 | Lindeborg | H04L 12/46 709/224 |
| 7,969,895 B2 | 6/2011 | Kamachi et al. | |
| 8,107,382 B2 * | 1/2012 | Lin | H04L 12/2697 370/244 |
| 8,139,584 B2 | 3/2012 | Suzuyama et al. | |

(Continued)

FOREIGN PATENT DOCUMENTS

| | | |
|---|---|---|
| JP | 11-191782 | 7/1999 |
| JP | 2006-238305 | 9/2006 |

(Continued)

OTHER PUBLICATIONS

U.S. Appl. No. 14/741,945 to Tokunori Ikegami, which was filed on Jun. 17, 2015.

*Primary Examiner* — Donald Mills
(74) *Attorney, Agent, or Firm* — Greenblum & Bernstein, P.L.C.

(57) ABSTRACT

According to the present invention, a network device includes a plurality of ports which are connected to a LAN; a communication controller; and a communication shutoff release unit. The communication controller includes: a linkup detection unit, a loop detection frame sending out unit that sends out the loop detection frame from a linkup detected port, which is a port for which the linkup is detected, after a predetermined period from a time point when the linkup is detected by the linkup detection unit to the local area network, and a loop detection frame detection unit that detects the loop detection frame if the loop detection frame is received on the each port. The communication shutoff release unit releases the shutoff of the communication on the linkup detected port only if the loop detection frame is not detected by the loop detection frame detection unit.

8 Claims, 12 Drawing Sheets

(56) References Cited

U.S. PATENT DOCUMENTS

| | | |
|---|---|---|
| 8,553,565 B2 | 10/2013 | Kamachi et al. |
| 2003/0016624 A1* | 1/2003 | Bare ................ H04L 29/12009 |
| | | 370/217 |
| 2005/0076140 A1* | 4/2005 | Fung .................... H04L 49/555 |
| | | 709/245 |
| 2006/0013141 A1* | 1/2006 | Mutoh ................ H04L 12/462 |
| | | 370/241 |
| 2007/0171814 A1* | 7/2007 | Florit .................... H04L 12/437 |
| | | 370/216 |
| 2009/0207742 A1 | 8/2009 | Suzuyama et al. |
| 2009/0219821 A1 | 9/2009 | Kamachi et al. |
| 2011/0134760 A1 | 6/2011 | Kamachi et al. |
| 2013/0016627 A1* | 1/2013 | Higashihara ............ H04L 43/10 |
| | | 370/254 |
| 2014/0204768 A1* | 7/2014 | Chen ...................... H04L 43/10 |
| | | 370/244 |
| 2015/0016473 A1* | 1/2015 | Wakabayashi .......... H04L 69/22 |
| | | 370/474 |

FOREIGN PATENT DOCUMENTS

| | | |
|---|---|---|
| JP | 2009-117889 | 5/2009 |
| JP | 2009-117899 | 5/2009 |
| JP | 2009-194752 | 8/2009 |
| JP | 2009-207028 | 9/2009 |

* cited by examiner

NETWORK DEVICE, COMMUNICATION METHOD, PROGRAM, AND RECORDING MEDIUM

BACKGROUND OF THE INVENTION

1. Field of the Invention

The present invention relates to dissolution of a loop relating to a network device (such as a switch).

2. Related Art

When a network device is connected incorrectly, a loop may be generated.

FIGS. 11(a) and 11(b) are diagrams showing an example of a network configuration in which a loop is generated according to prior art, and showing an example (FIG. 11(a)) of the network configuration before a loop is generated and an example (FIG. 11(b)) of the network configuration after the loop is generated.

Referring to FIG. 11(a), a port 101 of the switch 100 and a port 201 of a hub 200 are correctly connected by a local area network (LAN). It should be noted that the switch 100 includes ports 102 and 103 in addition to the port 101, and the hub 200 includes ports 202 and 203 in addition to the port 201.

However, referring to FIG. 11(b), the port 103 of the switch 100 and the port 203 of the hub 200 are incorrectly connected by a local area network. In this case, a loop is generated.

For example, a frame output (broadcasted) from the port 101 is output via the port 201 and the hub 200 from the port 203. Further, the frame output from the port 203 is output via the port 103 and the switch 100 from the port 101.

For example, a frame output (broadcasted) from the port 103 is output via the port 203 and the hub 200 from the port 201. Further, the frame output from the port 201 is output via the port 101 and the switch 100 from the port 103.

When a loop is generated in this way, a communication is interfered. It is thus known that a loop is detected by means of a loop detection frame (LDF), thereby dissolving the loop.

FIGS. 12(a) and 12(b) are diagrams showing a detection principle of a loop by means of the LDF according to prior art, and shows a case in which the LDF is output from the port 101 (FIG. 12(a)), and a case in which the LDF is output from the port 103 (FIG. 12(b)).

Referring to FIG. 12(a), when the LDF is output from the port 101, the LDF is output via the port 201 and the hub 200 from the port 203. Further, the LDF output from the port 203 is received at the port 103.

Referring to FIG. 12(b), when the LDF is output from the port 103, the LDF is output via the port 203 and the hub 200 from the port 201. Further, the LDF output from the port 201 is received at the port 101.

On this occasion, while the LDF is periodically (such as at an interval of 1 second) output from the each port of the switch 100, and if the LDF is detected at any port of the switch 100, it can be determined that a loop is generated. If the switch 100 determines that a loop is generated, the loop can be dissolved by shutting off a communication on a port (at least one port of ports 101 and 103) relating to the loop generation.

PRIOR ART DOCUMENTS

[Patent Document 1] JP 2009-194752 A
[Patent Document 2] JP 2009-207028 A
[Patent Document 3] JP 2009-117889 A
[Patent Document 4] JP 2006-238305 A
[Patent Document 5] JP Hei11(1999)-191782 A

SUMMARY OF THE INVENTION

However, the broadcast frame may be transmitted/received between the switch 100 and the hub 200 before the LDF is detected in the network configuration illustrated in FIGS. 12(a) and 12(b). In this case, a broadcast storm may be generated.

If a broadcast storm is generated, the switch 100 may not detect the loop detection frame LDF. In this case, the communication on the port 103 relating to the incorrect connection cannot be shut off, and the loop cannot be dissolved.

It is therefore an object of the present invention to avoid the disability of the detection of the LDF due to the broadcast storm.

According to the present invention, a network device including a plurality of ports which are connected to a local area network, and on which communication except for communication of a link test pulse and a loop detection frame is shut off, includes: a communication controller that controls the communication on the each port; and a communication shutoff release unit that releases the shutoff of the communication on any of the ports, wherein: the communication controller includes: a linkup detection unit that detects a linkup of the each port, a loop detection frame sending out unit that sends out the loop detection frame from a linkup detected port, which is a port for which the linkup is detected, after a predetermined period from a time point when the linkup is detected by the linkup detection unit to the local area network, and a loop detection frame detection unit that detects the loop detection frame if the loop detection frame is received on the each port; and the communication shutoff release unit releases the shutoff of the communication on the linkup detected port only if the loop detection frame is not detected by the loop detection frame detection unit.

According to the thus constructed network device, a network device including a plurality of ports which are connected to a local area network, and on which communication except for communication of a link test pulse and a loop detection frame is shut off, can be provided.

A communication controller controls the communication on the each port. A communication shutoff release unit releases the shutoff of the communication on any of the ports. A linkup detection unit detects a linkup of the each port. A loop detection frame sending out unit sends out the loop detection frame from a linkup detected port, which is a port for which the linkup is detected, after a predetermined period from a time point when the linkup is detected by the linkup detection unit to the local area network. A loop detection frame detection unit detects the loop detection frame if the loop detection frame is received on the each port. The communication shutoff release unit releases the shutoff of the communication on the linkup detected port only if the loop detection frame is not detected by the loop detection frame detection unit.

According to the network device of the present invention, the communication shutoff release unit may release the shutoff of the communication on the linkup detected port only if the loop detection frame is not detected by the loop detection frame detection unit in a predetermined detection period starting from the sending out of the loop detection frame.

According to the network device of the present invention, the predetermined period may be able to set by a user of the network device.

According to the network device of the present invention, the predetermined period may be 0.

According to the network device of the present invention, another network device may be connected to the network device; and the predetermined period may be longer than a difference between a period required for detecting the linkup of the network device and a period required for detecting the linkup of the other network device.

The present invention is a communication method with using a network device having a plurality of ports which are connected to a local area network, and on which communication except for communication of a link test pulse and a loop detection frame is shut off; a communication controller that controls the communication on the each port; and a communication shutoff release unit that releases the shutoff of the communication on any of the ports, the method including: a linkup detection step that detects a linkup of the each port; a loop detection frame sending out step that sends out the loop detection frame from a linkup detected port, which is a port for which the linkup is detected, after a predetermined period from a time point when the linkup is detected by the linkup detection step to the local area network; a loop detection frame detection step that detects the loop detection frame if the loop detection frame is received on the each port; and a communication shutoff release step that releases the shutoff of the communication on the linkup detected port only if the loop detection frame is not detected by the loop detection frame detection step.

The present invention is a program of instructions for execution by a computer to perform a communication process with using a network device having a plurality of ports which are connected to a local area network, and on which communication except for communication of a link test pulse and a loop detection frame is shut off; a communication controller that controls the communication on the each port; and a communication shutoff release unit that releases the shutoff of the communication on any of the ports, the process including: a linkup detection step that detects a linkup of the each port; a loop detection frame sending out step that sends out the loop detection frame from a linkup detected port, which is a port for which the linkup is detected, after a predetermined period from a time point when the linkup is detected by the linkup detection step to the local area network; a loop detection frame detection step that detects the loop detection frame if the loop detection frame is received on the each port; and a communication shutoff release step that releases the shutoff of the communication on the linkup detected port only if the loop detection frame is not detected by the loop detection frame detection step.

The present invention is a computer-readable medium having a program of instructions for execution by a computer to perform a communication process with using a network device having a plurality of ports which are connected to a local area network, and on which communication except for communication of a link test pulse and a loop detection frame is shut off; a communication controller that controls the communication on the each port; and a communication shutoff release unit that releases the shutoff of the communication on any of the ports, the process including: a linkup detection step that detects a linkup of the each port; a loop detection frame sending out step that sends out the loop detection frame from a linkup detected port, which is a port for which the linkup is detected, after a predetermined period from a time point when the linkup is detected by the linkup detection step to the local area network; a loop detection frame detection step that detects the loop detection frame if the loop detection frame is received on the each port; and a communication shutoff release step that releases the shutoff of the communication on the linkup detected port only if the loop detection frame is not detected by the loop detection frame detection step.

DESCRIPTION OF EMBODIMENTS

A description will now be given of an embodiment of the present invention referring to drawings.

Figure 1:
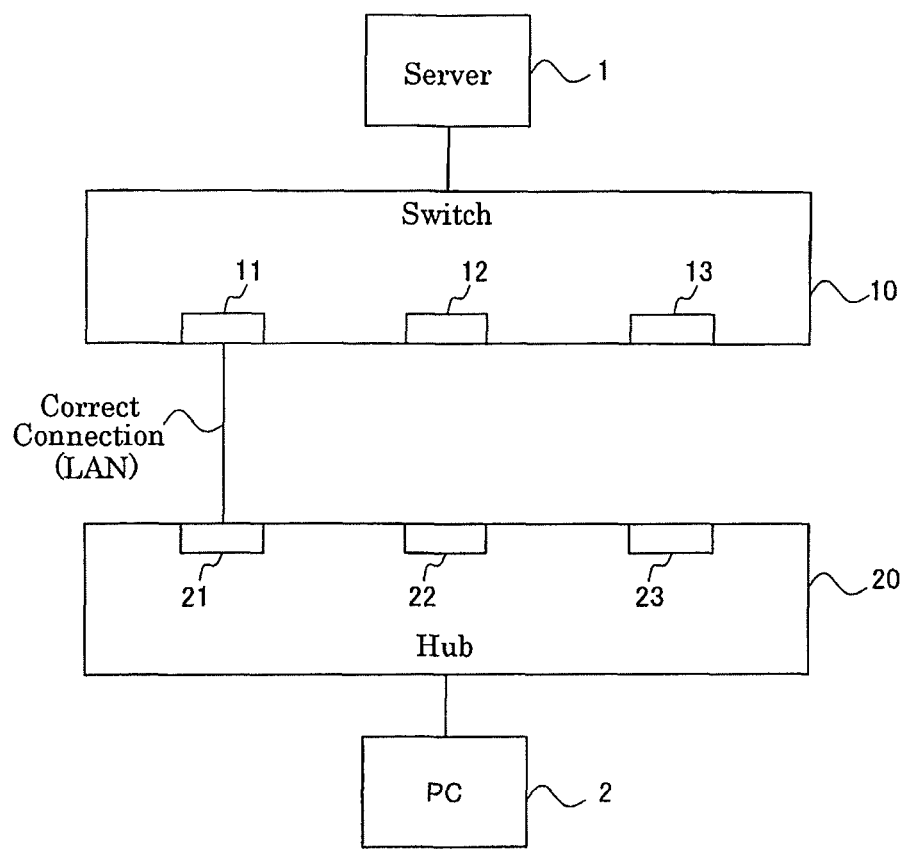
FIG. 1 is a diagram showing a network configuration if a switch 10 according to an embodiment of the present invention is correctly connected to a hub 20.

FIG. 1 is a diagram showing a network configuration if a switch 10 according to an embodiment of the present invention is correctly connected to a hub 20.

The switch (network device) 10 according to the embodiment of the present invention includes a plurality of ports 11, 12, and 13. The hub (another network device) 20 is connected to the switch 10. The hub 20 also includes a plurality of ports 21, 22, and 23. A server 1 is connected to the switch 10, and a PC (personal computer) 2 is connected to the hub 20.

The port 11 of the switch 10 and the port 21 of the hub 20 are connected with each other via a local area network (LAN). The port 11 of the switch 10 and the port 21 of the hub 20 are connected with each other via a well-known communication cable (such as 1000BASE-T cable), for example. This connection enables correct communication between the server 1 and the PC 2 via the switch 10 and the hub 20. On this occasion the connection between the port 11 and the port 21 is referred to as "correct connection".

In this way, the respective ports of the switch 10 and the hub 20 are connected to the local area network.

It should be noted that a connection port of the switch 10 to the server 1 and a connection port of the hub 20 to the PC 2 are omitted in FIG. 1.

Figure 2:
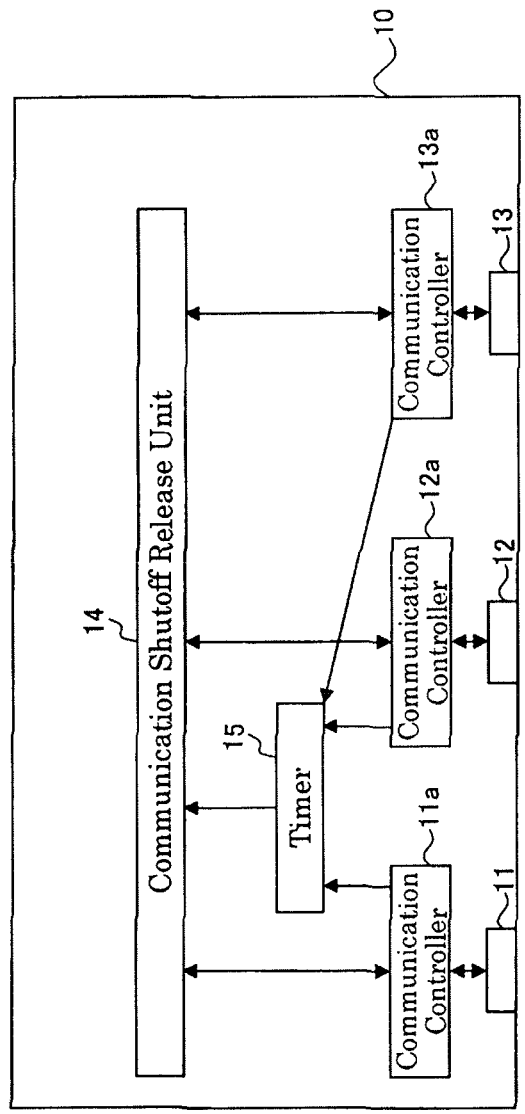
FIG. 2 is a functional block diagram showing a configuration of the switch 10 according to the embodiment of the present invention.

FIG. 2 is a functional block diagram showing a configuration of the switch 10 according to the embodiment of the present invention.

The switch 10 includes communication controllers 11a, 12a, and 13a, a communication shutoff unit 14 and a timer 15.

The communication controllers 11a, 12a, and 13a control communication on the respective ports 11, 12, and 13. The communication controller 11a is connected to the port 11 to control the communication on the port 11. The communication controller 12a is connected to the port 12 to control the communication on the port 12. The communication controller 13a is connected to the port 13 to control the communication on the port 13.

The communication shutoff release unit 14 releases the shutoff of the communication on any of the ports 11, 12, and 13. It should be noted that the communication on the ports 11, 12, and 13 is shut off except for communication of a link test pulse and a loop detection frame.

When a predetermined detection period (for example, refer to Δtd in FIG. 7) has elapsed after the timer 15 received such a notification that the loop detection frames are sent out from the communication controllers 11a, 12a, and 13a, the timer 15 notifies the communication shutoff release unit 14 of the elapse (time up).

It should be noted that the connection port of the switch 10 to the server 1 and mutual communication of data among communication controllers 11a, 12a, and 13a are omitted in FIG. 2.

Figure 3:
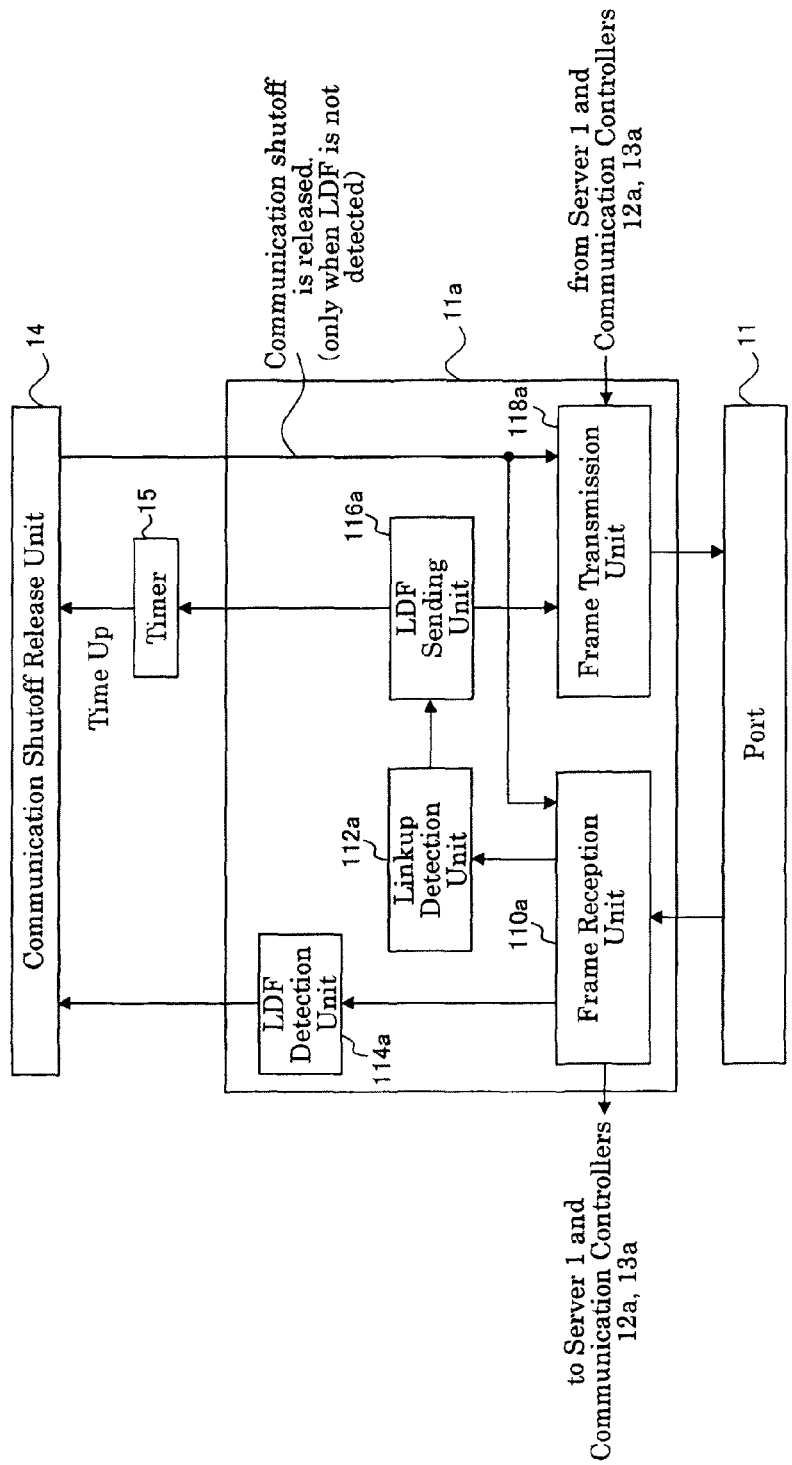
FIG. 3 is a functional block diagram showing a configuration of the communication controller 11a included by the switch 10 according to the embodiment of the present invention.

FIG. 3 is a functional block diagram showing a configuration of the communication controller 11a included by the switch 10 according to the embodiment of the present invention.

The communication controller 11a includes a frame reception unit 110a, a linkup detection unit 112a, a loop detection frame detection unit 114a, a loop detection frame sending unit 116a, and a frame transmission unit 118a.

The frame reception unit 110a receives a frame via the port 11. It should be noted that if a destination of the frame is the server 1, the frame reception unit 110a forwards the frame toward the server 1. Moreover, if the destination of the frame is the communication controller 12a, the frame reception unit 110a forwards the frame toward the communication controller 12a. Further, if the destination of the frame is the communication controller 13a, the frame reception unit 110a forwards the frame toward the communication controller 13a. For example, if the frame reception unit 110a receives a broadcasted frame via the port 11, the frame reception unit 110a forwards the frame toward the server 1, the communication controller 12a, and the communication controller 13a.

The linkup detection unit 112a detects a linkup of the port 11. The linkup of the port 11 refers to a state where the port 11 is connected to another network device (such as the hub 20) (via a cable of 1000BASE-T for example), and is brought into a state where the communication is available.

The linkup detection unit 112a reads a frame received by the frame reception unit 110a from the frame reception unit 110a, and, if the frame read from the frame reception unit 110a is a link test pulse (for example, a normal link pulse (NLP)), detects the linkup of the port 11.

When a predetermined period (refer to Δt in FIG. 7, for example) has elapsed since a time point when the linkup is detected by the linkup detection unit 112a, the loop detection frame sending unit 116a sends a loop detection frame (LDF) from the port 11, which is a linkup detected port, to a local area network via the frame transmission unit 118a. The loop detection frame may be broadcasted. It should be noted that, though the LDF is mentioned as an example of the loop detection frame, it is only necessary for the loop detection frame to be distinguished from a frame used for ordinary communication.

It should be noted that the linkup detected port is the port on which the linkup is detected. If the linkup is detected by the linkup detection unit 112a, the port 11 is the linkup detected port.

If the loop detection frame detection unit 114a receives the loop detection frame on the port 11, the loop detection frame detection unit 114a detects the loop detection frame. The detection of the loop detection frame is sent to the communication shutoff unit 14.

The loop detection frame detection unit 114a reads the frame received by the frame reception unit 110a from the frame reception unit 110a. If the read frame is the loop detection frame, the loop detection frame detection unit 114a detects the loop detection frame.

The frame transmission unit 118a transmits a frame (such as a loop detection frame) via the port 11. It should be noted that if the frame transmission unit 118a receives a frame from the server 1, the communication controller 12a, and the communication controller 13a, the frame transmission unit 118a transmits the frame via the port 11.

When the predetermined detection period (for example, refer to Δtd in FIG. 7) has elapsed after the timer 15 received, from the loop detection frame sending out unit 116a, the notification that the loop detection frame is sent out, the timer 15 notifies the communication shutoff release unit 14 of the elapse (time up).

The communication shutoff release unit 14 releases the shutoff of the communication on the port 11, which is the linkup detected port, only if the loop detection frame is not detected by the loop detection frame detection unit 114a in the predetermined detection period Δtd starting from the sending out of the loop detection frame.

For example, when the communication shutoff release unit 14 receives the notification of the time up from the timer 15, if the communication shutoff release unit 14 has not received, from the loop detection frame detection unit 114a, such a notification that the loop detection frame has been detected, the communication shutoff release unit 14 releases the shutoff of the communication on the port 11, which is the linkup detected port.

It should be noted that the shutoff of the communication on the port 11 means stop of the reception by the frame reception unit 110a, and also stop of the transmission by the frame transmission unit 118a. It should be noted that the stop of the reception by the frame reception unit 110a includes a case in which a frame is received by the frame reception unit 110a, but the frame is discarded.

Figure 4:
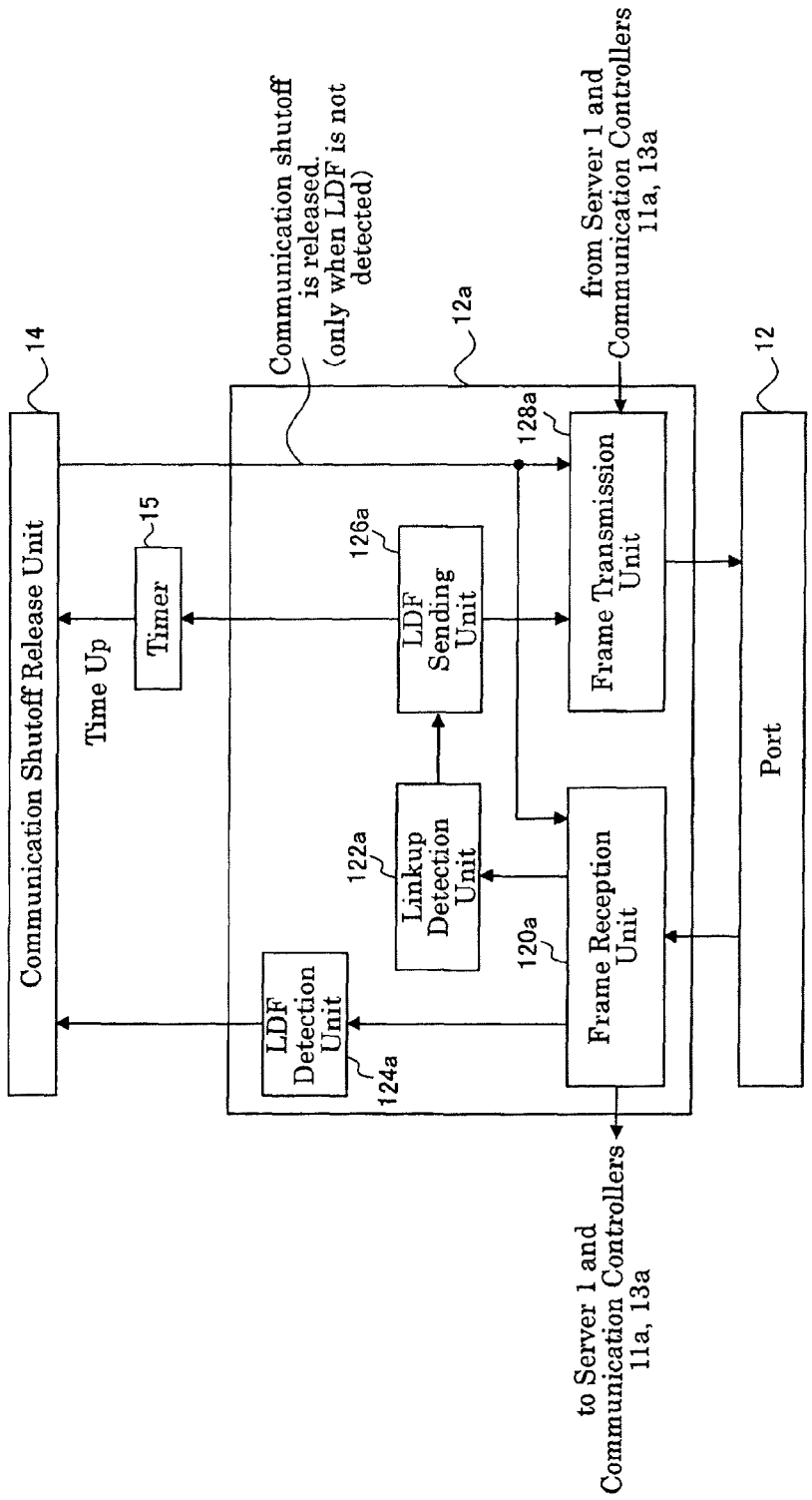
FIG. 4 is a functional block diagram showing a configuration of the communication controller 12a included by the switch 10 according to the embodiment of the present invention.

FIG. 4 is a functional block diagram showing a configuration of the communication controller 12a included by the switch 10 according to the embodiment of the present invention.

The communication controller 12a includes a frame reception unit 120a, a linkup detection unit 122a, a loop detection frame detection unit 124a, a loop detection frame sending unit 126a, and a frame transmission unit 128a.

The frame reception unit 120a, the linkup detection unit 122a, the loop detection frame detection unit 124a, the loop detection frame sending unit 126a, and the frame transmission unit 128a are respectively the same as the frame reception unit 110a, the linkup detection unit 112a, the loop detection frame detection unit 114a, the loop detection frame sending unit 116a, and the frame transmission unit 118a.

It should be noted that the frame reception unit 120a, the linkup detection unit 122a, the loop detection frame detection unit 124a, the loop detection frame sending unit 126a, and the frame transmission unit 128a carry out processing relating to the port 12, which is a point different from the frame reception unit 110a, the linkup detection unit 112a, the loop detection frame detection unit 114a, the loop detection frame sending unit 116a, and the frame transmission unit 118a which carry out processing relating to the port 11.

Moreover, if a destination of the frame is the communication controller 11a, the frame reception unit 120a forwards the frame toward the communication controller 11a. For example, if the frame reception unit 120a receives a broadcasted frame via the port 12, the frame reception unit 120a forwards the frame toward the server 1, the communication controller 11a, and the communication controller 13a.

Further, the frame transmission unit 128a transmits a frame (such as a loop detection frame) via the port 12. It should be noted that if the frame transmission unit 128a receives a frame from the server 1, the communication controller 11a, and the communication controller 13a, the frame transmission unit 128a transmits the frame via the port 12.

When the predetermined detection period (for example, refer to Δtd in FIG. 7) has elapsed after the timer 15 received, from the loop detection frame sending out unit 126a, the notification that the loop detection frame has been sent out, the timer 15 notifies the communication shutoff release unit 14 of the elapse (time up).

The communication shutoff release unit 14 releases the shutoff of the communication on the port 12, which is the linkup detected port, only if the loop detection frame is not detected by the loop detection frame detection unit 124a in the predetermined detection period Δtd starting from the sending out of the loop detection frame.

For example, when the communication shutoff release unit 14 receives the notification of the time up from the timer 15, if the communication shutoff release unit 14 has not received, from the loop detection frame detection unit 124a, the notification that the loop detection frame has been detected, the communication shutoff release unit 14 releases the shutoff of the communication on the port 12, which is the linkup detected port.

It should be noted that the shutoff of the communication on the port 12 means stop of the reception by the frame reception unit 120a, and also stop of the transmission by the frame transmission unit 128a. It should be noted that the stop of the reception by the frame reception unit 120a includes a case in which a frame is received by the frame reception unit 120a, but the frame is discarded.

Figure 5:
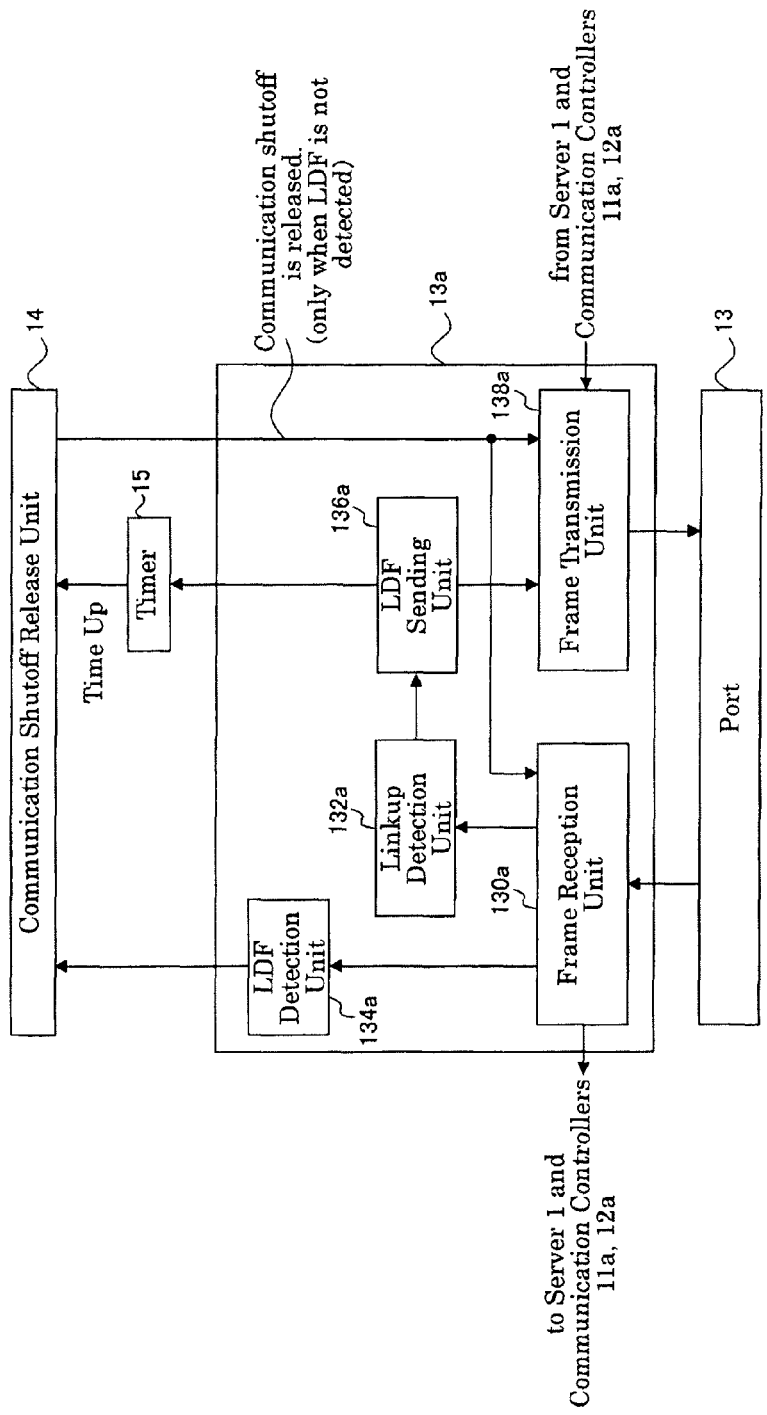
FIG. 5 is a functional block diagram showing a configuration of the communication controller 13a included by the switch 10 according to the embodiment of the present invention.

FIG. 5 is a functional block diagram showing a configuration of the communication controller 13a included by the switch 10 according to the embodiment of the present invention.

The communication controller 13a includes a frame reception unit 130a, a linkup detection unit 132a, a loop detection frame detection unit 134a, a loop detection frame sending unit 136a, and a frame transmission unit 138a.

The frame reception unit 130a, the linkup detection unit 132a, the loop detection frame detection unit 134a, the loop detection frame sending unit 136a, and the frame transmission unit 138a are respectively the same as the frame reception unit 110a, the linkup detection unit 112a, the loop detection frame detection unit 114a, the loop detection frame sending unit 116a, and the frame transmission unit 118a.

It should be noted that the frame reception unit 130a, the linkup detection unit 132a, the loop detection frame detection unit 134a, the loop detection frame sending unit 136a, and the frame transmission unit 138a carry out processing relating to the port 13, which is a point different from the frame reception unit 110a, the linkup detection unit 112a, the loop detection frame detection unit 114a, the loop detection frame sending unit 116a, and the frame transmission unit 118a which carry out processing relating to the port 11.

Moreover, if a destination of the frame is the communication controller 11a, the frame reception unit 130a forwards the frame toward the communication controller 11a. For example, if the frame reception unit 130a receives a broadcasted frame via the port 13, the frame reception unit 130a forwards the frame toward the server 1, the communication controller 11a, and the communication controller 12a.

Further, the frame transmission unit 138a transmits a frame (such as a loop detection frame) via the port 13. It should be noted that if the frame transmission unit 138a receives a frame from the server 1, the communication controller 11a, and the communication controller 12a, the frame transmission unit 138a transmits the frame via the port 13.

When the predetermined detection period (for example, refer to Δtd in FIG. 7) has elapsed after the timer 15 received the notification, from the loop detection frame sending out unit 136a, that the loop detection frame has been sent out, the timer 15 notifies the communication shutoff release unit 14 of the elapse (time up).

The communication shutoff release unit 14 releases the shutoff of the communication on the port 13, which is the linkup detected port, only if the loop detection frame is not detected by the loop detection frame detection unit 134a in the predetermined detection period Δtd starting from the sending out of the loop detection frame.

For example, when the communication shutoff release unit 14 receives the notification of the time up from the timer 15, if the communication shutoff release unit 14 has not received, from the loop detection frame detection unit 134a, the notification that the loop detection frame has been detected, the communication shutoff release unit 14 releases the shutoff of the communication on the port 13, which is the linkup detected port.

It should be noted that the shutoff of the communication on the port 13 means stop of the reception by the frame reception unit 130a, and also stop of the transmission by the frame transmission unit 138a. It should be noted that the stop of the reception by the frame reception unit 130a includes a case in which a frame is received by the frame reception unit 130a, but the frame is discarded.

It should be noted that if the detection of the loop detection frame is notified from the loop detection frame detection unit 114a, 124a, or 134a to the communication shutoff release unit 14, the shutoff of the communication on the linkup detected port is not released.

A description will now be given of an operation of the embodiment of the present invention.

Figure 6:
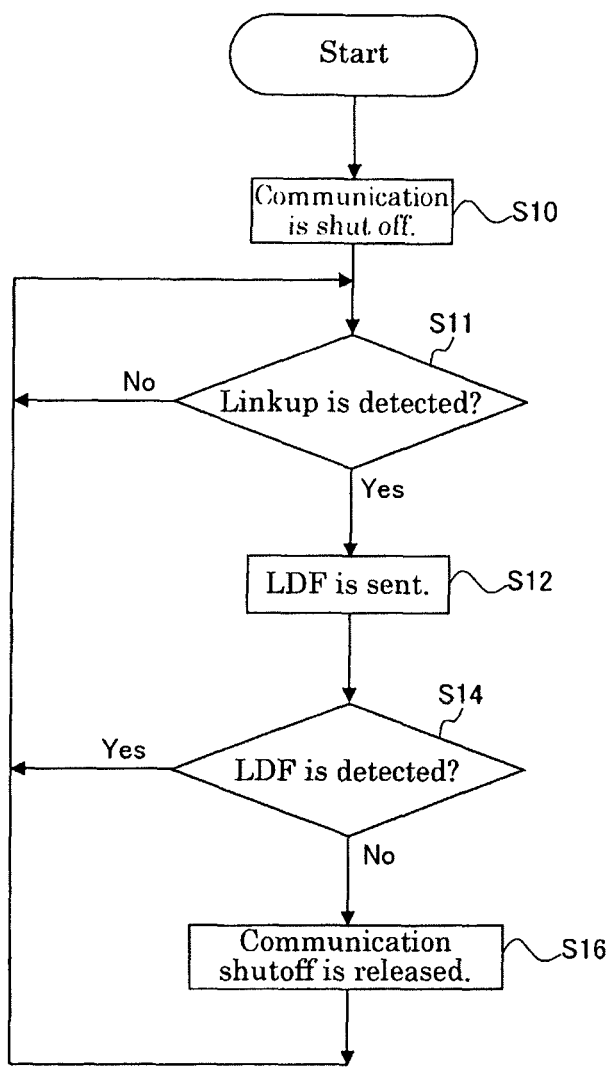
FIG. 6 is a flowchart showing an operation of the switch 10 according to the embodiment of the present invention.
Figure 7:
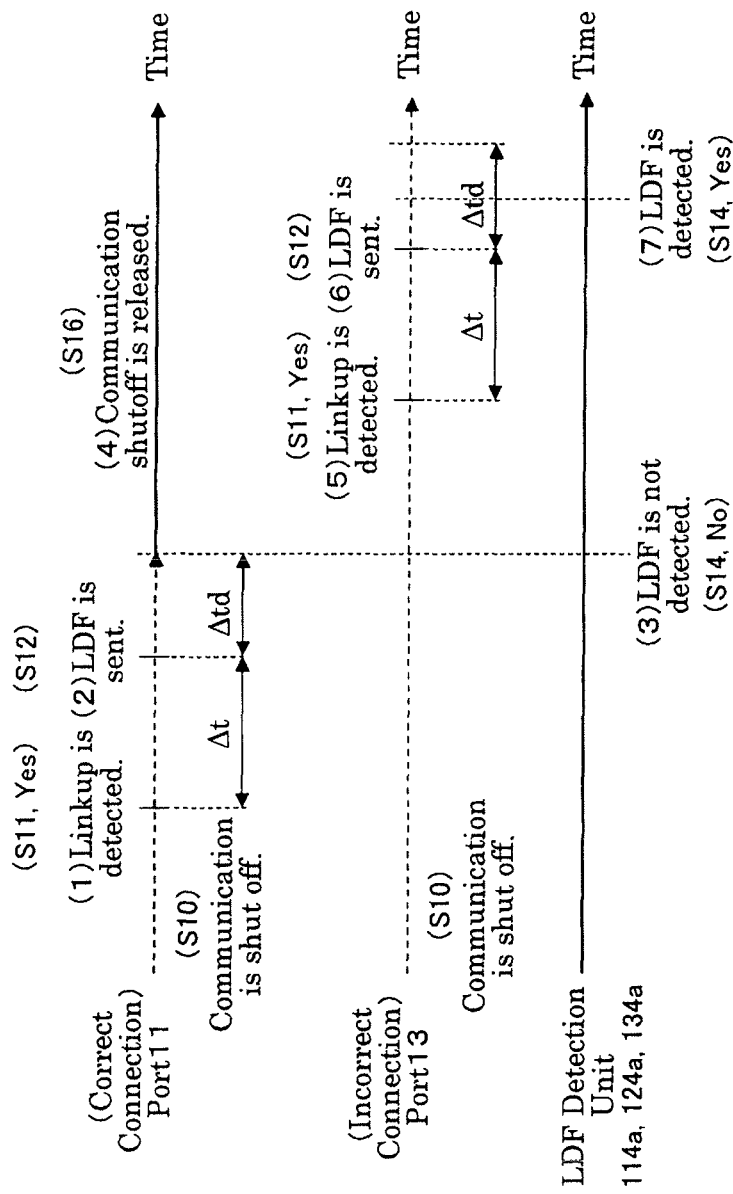
FIG. 7 is a diagram showing timings of the operation of the switch 10 according to the embodiment of the present invention.
Figure 8:
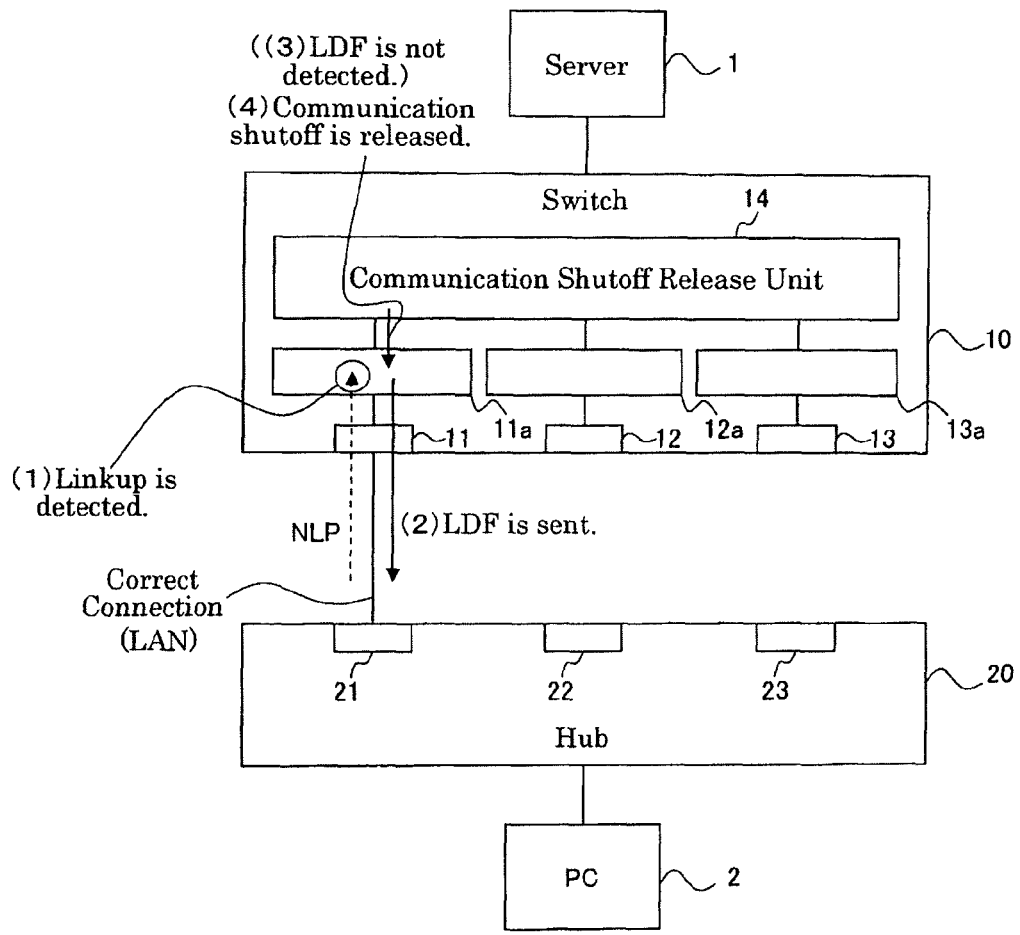
FIG. 8 is a diagram showing an operation of the switch 10 if the switch 10 according to the embodiment of the present invention is correctly connected to the hub 20.
Figure 9:
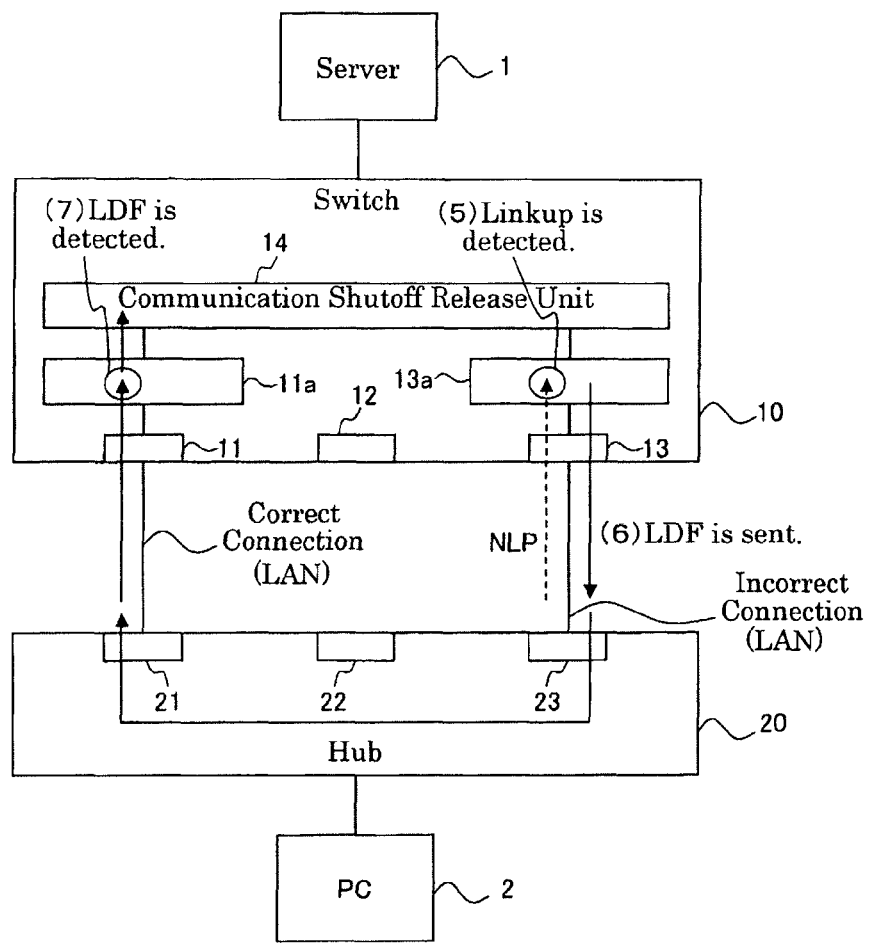
FIG. 9 is a diagram showing an operation of the switch 10 if the switch 10 according to the embodiment of the present invention is incorrectly connected to the hub 20.

FIG. 6 is a flowchart showing an operation of the switch 10 according to the embodiment of the present invention. FIG. 7 is a diagram showing timings of the operation of the switch 10 according to the embodiment of the present invention. FIG. 8 is a diagram showing an operation of the switch 10 if the switch 10 according to the embodiment of the present invention is correctly connected to the hub 20. FIG. 9 is a diagram showing an operation of the switch 10 if the switch 10 according to the embodiment of the present invention is incorrectly connected to the hub 20. A timer 15 is omitted in FIGS. 8 and 9.

A description is given of the operation of the embodiment of the present invention after the correct connection is made as shown in FIG. 8 until the incorrect connection is made as shown in FIG. 9 with reference to FIGS. 6 and 7.

Referring to FIG. 6, first, the communication except for the communication of the link test pulse and the loop detection frame is shut off on the ports 11, 12, and 13 (S10). The linkup detection units 112a, 122a, and 132a wait until the ports 11, 12, and 13 are linked up (No in S11). When the port 11, 12, or 13 is linked up, the linkup detection unit 112a, 122a, or 132a detects the linkup (Yes in S11).

When the predetermined period Δt has elapsed after the linkup detection, the loop detection frame sending out unit 116a, 126a, or 136a to which the linkup detection unit 112a, 122a, or 132a, which has detected the linkup, is connected, sends out the loop detection frame LDF via the frame transmission unit 118a, 128a, or 138a from the port 11, 12, or 13, which is the linkup detected port (S12). It should be noted that the loop detection frame sending out unit 116a, 126a, or 136a transmits, to the timer 15, the notification that the loop detection frame has been sent out, and the timer 15 starts timing.

The loop detection frame detection units 114a, 124a, and 134a wait until the detection of the loop detection frame LDF (No in S14). However, the loop detection frame LDF is not detected. As a result, when the predetermined detection period Δtd has elapsed after the sending out of the loop detection frame, the timer 15 notifies the communication shutoff release unit 14 of the time up, but the communication shutoff release unit 14 has not received the notification that the loop detection frame is detected, and thus releases the shutoff of the communication on the port 11, which is the linkup detected port (S16).

For example, as shown in FIG. 8, the port 11 of the switch 10 and the port 21 of the hub 20 are correctly connected with each other. Then, a normal link pulse NLP, which is a kind of a link test pulse, is transmitted from the port 21 of the hub 20 to the port 11 of the switch 10. The normal link pulse NLP is detected by the linkup detection unit 112a of the communication controller 11a (refer to "Yes in S11" in FIG. 6). Refer to "(1) Linkup is detected" in FIGS. 7 and 8. In this case, the port 11 is the linkup detected port.

When the predetermined period Δt has elapsed after the linkup detection, the loop detection frame sending unit 116a to which the linkup detection unit 112a, which has detected the linkup in the communication controller 11a, is connected sends the loop detection frame LDF via the frame transmission unit 118a from the port 11, which is the linkup detected port (refer to "S12" in FIG. 6). Refer to "(2) LDF is sent" in FIGS. 7 and 8.

It should be noted that the predetermined period Δt may be set by a user of the switch 10. It should be noted that the predetermined period Δt may be fixed when the switch 10 is delivered.

Referring to FIG. 8, even if the loop detection frame LDF is sent out, the loop detection frame LDF will not return from the hub 20 to the switch 10, and the loop detection frame detection units 114a, 124a, and 134a will not detect the loop detection frame LDF even when the detection period Δtd has elapsed after the loop detection frame LDF was sent out ("No in S14" in FIG. 6). Refer to "(3) LDF is not detected" in FIGS. 7 and 8. Thus, the shutoff of the communication on the port 11, which is the linkup detected port, is released (refer to "S16" in FIG. 6). Refer to "(4) Communication shutoff is released" in FIGS. 7 and 8.

Returning to FIG. 6, if the loop detection frame sending out unit 116a, 126a, or 136a detects the loop detection frame LDF (Yes in S14), the loop detection frame sanding out unit 116a, 126a, or 136a notifies the communication shutoff release unit 14 of the detection. Then, the release of the communication shutoff by the communication shutoff release unit 14 is not carried out, and the linkup detection (Yes in S11) is waited for. As a result, the loop is prevented from being formed.

For example, in the state of the correct connection as shown in FIG. 8, it is assumed that the port 13 of the switch 10 and the port 23 of the hub 20 are incorrectly connected with each other (referred to as "incorrect connection"). An operation of the switch 10 for the incorrect connection is shown in FIG. 9.

Then, referring to FIG. 9, the communication except for the communication of the link test pulse and the loop detection frame is shut off on the ports 12 and 13 (S10). It should be noted that the shutoff of the communication has already been released on the port 11 as described before. Further, the normal link pulse NLP is transmitted from the port 23 of the hub 20 to the port 13 of the switch 10. The normal link pulse NLP is detected by the linkup detection unit 132a of the communication controller 13a (refer to "Yes in S11" in FIG. 6). Refer to "(5) Linkup is detected" in FIGS. 7 and 9. In this case, the port 13 is the linkup detected port.

When the predetermined period Δt has elapsed after the linkup detection, the loop detection frame sending unit 136a to which the linkup detection unit 132a, which has detected the linkup in the communication controller 13a, is connected sends the loop detection frame LDF via the frame transmission unit 138a from the port 13, which is the linkup detected port (refer to "S12" in FIG. 6). Refer to "(6) LDF is sent" in FIGS. 7 and 9. The port 13 is recorded as the sending port in this loop detection frame LDF.

It should be noted that the predetermined period Δt may be set by the user of the switch 10 as described before. It should be noted that the predetermined period Δt may be fixed when the switch 10 is delivered.

Referring to FIG. 9, when the loop detection frame LDF is sent from the port 13, the loop detection frame LDF is output via the port 23 and the hub 20 from the port 21. Further, the loop detection frame LDF output from the port 21 of the hub 20 is received on the port 11 of the switch 10.

Thus, the loop detection frame LDF is detected by the loop detection frame detection unit 114*a* of the communication controller 11*a* (refer to "Yes in S14" in FIG. 6). Refer to "(7) LDF is detected" in FIGS. 7 and 9.

The loop detection frame detection unit 114*a* notifies the communication shutoff release unit 14 of the detection of the loop detection frame. The communication shutoff release unit 14 receives this notification, and does not release the shutoff of the communication on the port 13, which is the linkup detected port.

If the shutoff of the communication on the port 13 is released, a loop is generated, which constitutes an obstruction of the communication. However, the loop can be prevented from being formed by maintaining the shutoff of the communication on the port 13 without release.

According to the embodiment of the present invention, the communication on the port 13 is maintained to be shut off, and the loop can thus be prevented from being formed. The formation of the loop is prevented, and the broadcast storm is thus not generated. Therefore, the LDF is prevented from being undetectable by the broadcast storm.

The above-mentioned effect is provided by the sending of the loop detection frame LDF triggered by the linkup detection. The above-mentioned effect cannot be provided only by periodically sending the loop detection frame LDF. It should be noted that such a case of setting the predetermined period Δt to 0 is conceivable.

It should be noted that the following modified examples of the embodiment of the present invention are conceivable.

Figure 10:
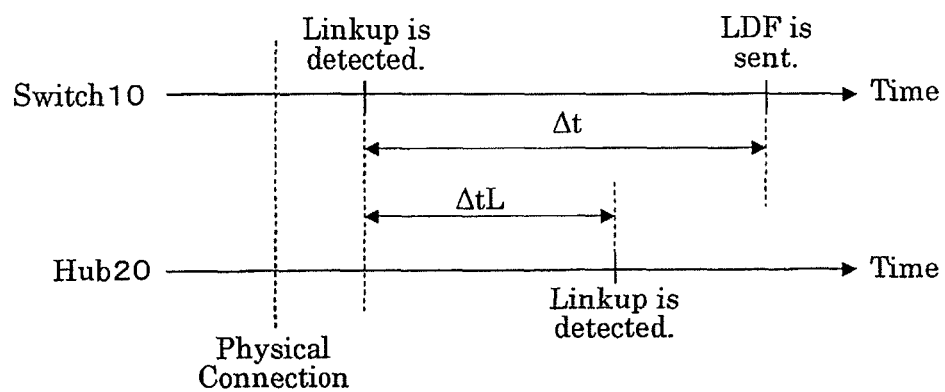
FIG. 10 is a diagram showing a preferred example of the predetermined period Δt.
Figure 11A:
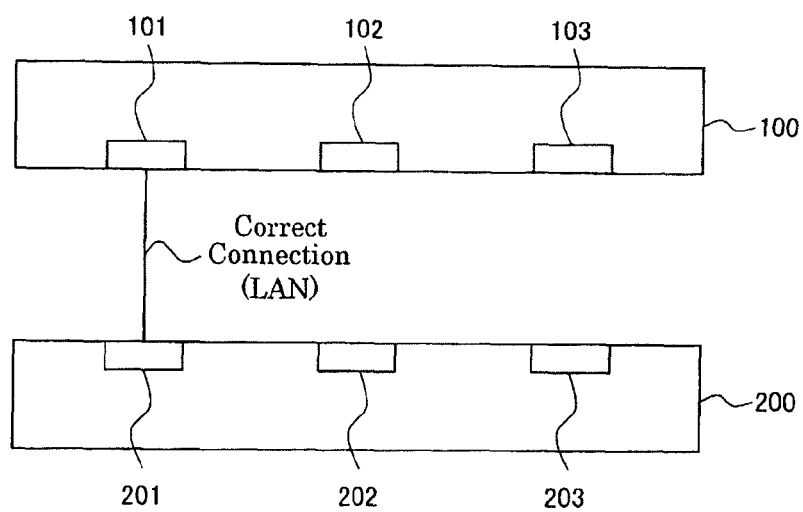
FIGS. 11(a) and 11(b) are diagrams showing an example of a network configuration in which a loop is generated according to prior art, and showing an example (FIG. 11(a)) of the network configuration before a loop is generated and an example (FIG. 11(b)) of the network configuration after the loop is generated.
Figure 11B:
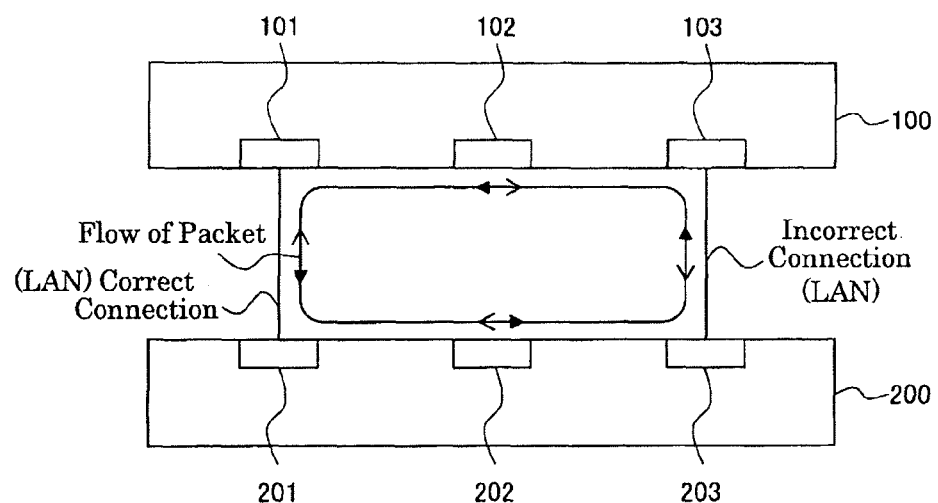
Figure 12A:
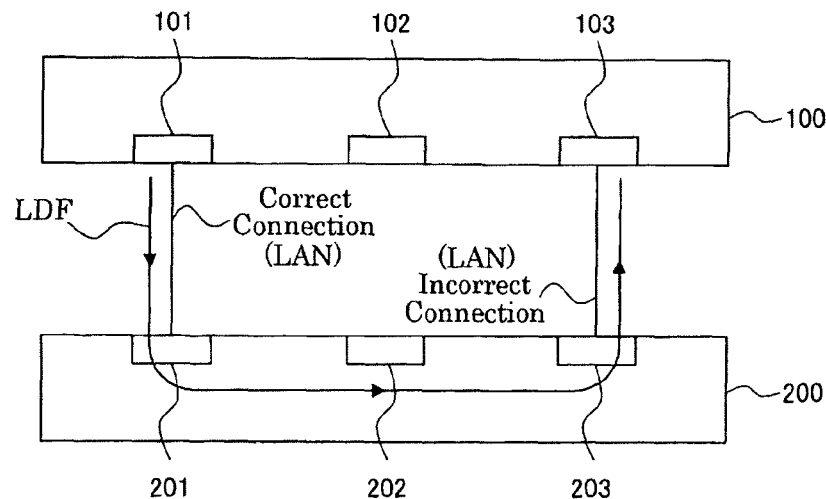
FIGS. 12(a) and 12(b) are diagrams showing a detection principle of a loop by means of the LDF according to prior art, and shows a case in which the LDF is output from the port 101 (FIG. 12(a)), and a case in which the LDF is output from the port 103 (FIG. 12(b)).
Figure 12B:
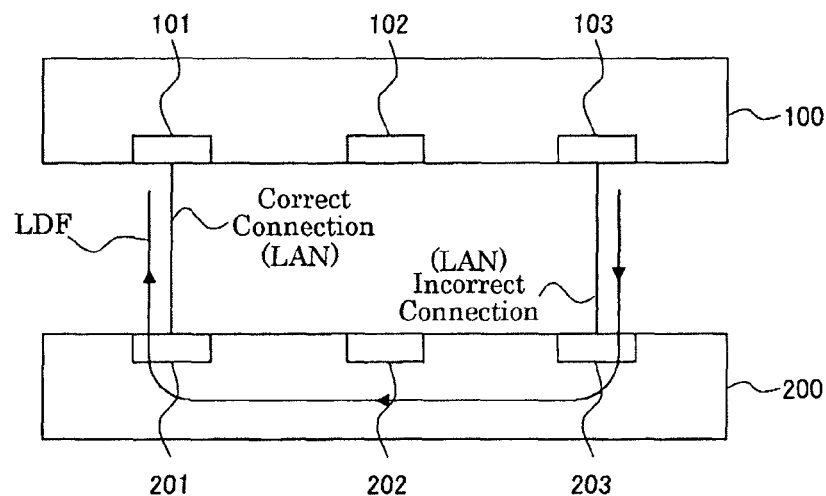

FIG. 10 is a diagram showing a preferred example of the predetermined period Δt.

The predetermined period Δt (refer to FIG. 7) is preferably longer than a difference ΔtL between the period required for detecting the linkup by the switch 10 and the period required for detecting the linkup by the hub 20. For example, it is conceivable to set Δt to 0.5 second. It should be noted that the period required for detecting the linkup is a period from a physical connection via a communication cable until the detection of the linkup.

In general, the switch 10 can carry out data processing at a higher speed than the hub 20, and the detection of the linkup by the switch 10 is finished earlier than the detection of the linkup by the hub 20. Moreover, communication on a certain port (such as the port 23) may be configured to be shut off until the linkup is detected for this port in the hub 20.

If the loop detection frame LDF is sent immediately after the linkup on the port 13 is detected by the switch 10, there may be generated such a state that the hub 20 may have not detected the linkup on the port 23. Then, the hub 20 shuts off the loop detection frame LDF transmitted toward the port 23, and the switch 10 cannot detect the loop detection frame LDF. In this state, although the connection is incorrect, the communication is not shut off, and the loop cannot be dissolved.

Thus, the loop detection frame LDF is preferably sent after the detection of the linkup by the hub 20. The predetermined period Δt (refer to FIG. 7) is preferably longer than the difference ΔtL between the period required for detecting the linkup by the switch 10 and the period required for detecting the linkup by the hub 20.

Moreover, the above-described embodiment may be realized in the following manner. A computer is provided with a CPU, a hard disk, and a media (such as a floppy(registered trade mark) disk and a CD-ROM) reader, and the media reader is caused to read a medium recording a program realizing the above-described respective components such as the respective components of the switch 10, thereby installing the program on the hard disk. This method may also realize the above-described functions.

What is claimed is:

1. A network device including a plurality of ports which are connected to a local area network, and on which communication except for communication of a link test pulse and a loop detection frame is shut off, comprising:
   a communication controller that controls the communication on each of the plurality of ports; and
   a communication shutoff release unit that releases the shutoff of the communication on any of the plurality of ports, wherein:
   the communication controller includes:
      a linkup detection unit that detects a linkup of each of the plurality of ports,
      a loop detection frame sending out unit that sends out the loop detection frame from a linkup detected port, which is a port for which the linkup is detected, after a predetermined period from a time point when the linkup is detected by the linkup detection unit to the local area network, and
      a loop detection frame detection unit that detects the loop detection frame when the loop detection frame is received on each of the plurality of ports; and
   the communication shutoff release unit releases the shutoff of the communication on the linkup detected port only when the loop detection frame is not detected by the loop detection frame detection unit.

2. The network device according to claim 1, wherein the communication shutoff release unit releases the shutoff of the communication on the linkup detected port only when the loop detection frame is not detected by the loop detection frame detection unit in a predetermined detection period starting from the sending out of the loop detection frame.

3. The network device according to claim 1, wherein the predetermined period can be set by a user of the network device.

4. The network device according to claim 1, wherein the predetermined period is 0.

5. The network device according to claim 1, wherein:
   another network device is connected to the network device; and
   the predetermined period is longer than a difference between a period required for detecting the linkup of the network device and a period required for detecting the linkup of the other network device.

6. A communication method with using a network device having a plurality of ports which are connected to a local area network, and on which communication except for communication of a link test pulse and a loop detection frame is shut off; a communication controller that controls the communication on each of the plurality of ports; and a communication shutoff release unit that releases the shutoff of the communication on any of the ports, said method comprising:
   detecting a linkup of each of the plurality of ports;
   sending out the loop detection frame from a linkup detected port, which is a port for which the linkup is detected, after a predetermined period from a time point when the linkup is detected to the local area network;
   detecting the loop detection frame when the loop detection frame is received on each of the plurality of ports; and
   releasing the shutoff of the communication on the linkup detected port only when the loop detection frame is not detected.

7. A non-transitory computer readable medium encoded with a program of instructions for execution by a computer to perform communication operations with a network device having a plurality of ports which are connected to a local area network, and on which communication except for communication of a link test pulse and a loop detection frame is shut off; a communication controller that controls the communication on each of the plurality of ports; and a communication shutoff release unit that releases the shutoff of the communication on any of the ports, said operations comprising:

detecting a linkup of each of the plurality of ports;

transmitting the loop detection frame from a linkup detected port, which is a port for which the linkup is detected, after a predetermined period from a time point when the linkup is detected to the local area network;

detecting the loop detection frame when the loop detection frame is received on each of the plurality of ports; and releasing the shutoff of the communication on the linkup detected port only when the loop detection frame is not detected.

8. A non-transitory computer-readable medium having a program of instructions for execution by a computer to perform a communication process with using a network device having a plurality of ports which are connected to a local area network, and on which communication except for communication of a link test pulse and a loop detection frame is shut off; a communication controller that controls the communication on each of the plurality of ports; and a communication shutoff release unit that releases the shutoff of the communication on any of the ports, said process comprising:

detecting a linkup of each of the plurality of ports;

sending out the loop detection frame from a linkup detected port, which is a port for which the linkup is detected, after a predetermined period from a time point when the linkup is detected to the local area network;

detecting the loop detection frame when the loop detection frame is received on each of the plurality of ports; and releasing the shutoff of the communication on the linkup detected port only when the loop detection frame is not detected.

\* \* \* \* \*